US012508728B2

(12) United States Patent
Stevens

(10) Patent No.: US 12,508,728 B2
(45) Date of Patent: Dec. 30, 2025

(54) KNIFE AND CUTTING GUIDE FOR CUTTING FIBROUS OR THICK SHEET MATERIALS

(71) Applicant: Lee Hiram Stevens, Erie, CO (US)

(72) Inventor: Lee Hiram Stevens, Erie, CO (US)

( * ) Notice: Subject to any disclaimer, the term of this patent is extended or adjusted under 35 U.S.C. 154(b) by 390 days.

(21) Appl. No.: 17/974,705

(22) Filed: Oct. 27, 2022

(65) Prior Publication Data

US 2023/0150153 A1 May 18, 2023

Related U.S. Application Data

(60) Provisional application No. 63/278,662, filed on Nov. 12, 2021, provisional application No. 63/278,654, filed on Nov. 12, 2021.

(51) Int. Cl.

| | |
|---|---|
| ***B26B 5/00*** | (2006.01) |
| ***B25G 1/10*** | (2006.01) |
| ***B26B 29/02*** | (2006.01) |
| ***B26B 29/06*** | (2006.01) |

(52) U.S. Cl.

CPC ................ *B26B 5/00* (2013.01); *B25G 1/102* (2013.01); *B26B 29/02* (2013.01); *B26B 29/06* (2013.01)

(58) Field of Classification Search

CPC . B25G 1/102; B25G 1/00; B25G 1/10; B23D 51/01; B23D 51/10; B23D 49/06; B23D 49/08; B23D 49/11; B23D 49/12; B26B 29/02; B26B 29/06; B26B 3/00; B26B 3/02; B26B 5/00; F41B 13/02; B27B 21/04

USPC ...... 30/340, 517–519, 286, 295, 166.3, 510, 30/280, 314, 317, 233; D8/97, 98; 33/429, 474; D7/649, 401.2; D22/118

See application file for complete search history.

(56) References Cited

U.S. PATENT DOCUMENTS

| | | | | | |
|---|---|---|---|---|---|
| 1,485,261 | A * | 2/1924 | Fearing | B23D 61/123 30/166.3 |
| 1,708,551 | A * | 4/1929 | Nell | B43L 13/20 33/476 |
| 2,101,362 | A * | 12/1937 | Davidson | B23D 51/125 83/697 |
| 2,102,782 | A * | 12/1937 | Blum | B23D 51/14 30/513 |
| D169,797 | S * | 6/1953 | Wallace | D8/DIG. 3 |

(Continued)

FOREIGN PATENT DOCUMENTS

| | | | | |
|---|---|---|---|---|
| CN | 112161518 A * | 1/2021 | F41B 13/08 |
| FR | 2870475 A1 * | 11/2005 | B25G 1/102 |

(Continued)

OTHER PUBLICATIONS

CN-112161518-A English Translation; Jan. 1, 2021 Wang F.*
Three photos of three different prior art insulation knives.

*Primary Examiner* — Laura M Lee
(74) *Attorney, Agent, or Firm* — Leyendecker & Lemire

(57) ABSTRACT

A knife and associated guide for the cutting of fibrous batt insulation products, as well as rigid foam board insulation products are described. The knife has a handle and blade, each oriented so as to maximize the ability to pull the blade through the material to be cut, while minimizing the muscular effort and strain required of the user. The guide is configured to easily compress batt insulation products and to be easily moved over the products for improved efficiency.

13 Claims, 9 Drawing Sheets

(56) References Cited

U.S. PATENT DOCUMENTS

| | | | | | |
|---|---|---|---|---|---|
| 2,642,674 | A * | 6/1953 | Schell, Jr. | E04F 21/22 | 52/749.11 |
| 3,576,148 | A * | 4/1971 | Katz | B26B 29/06 | 83/522.18 |
| 3,840,059 | A * | 10/1974 | Ingro | B23D 49/11 | 30/514 |
| D271,124 | S * | 10/1983 | Ferraro | D22/118 | |
| 4,505,039 | A * | 3/1985 | Donovan | B26B 29/06 | 269/295 |
| 5,075,974 | A * | 12/1991 | McIlhatten | B26B 29/02 | 30/294 |
| 5,191,716 | A * | 3/1993 | Anderson | B43L 7/00 | 33/483 |
| 5,325,594 | A * | 7/1994 | Szafranski | B26B 5/005 | 30/294 |
| 5,400,512 | A * | 3/1995 | Brush | B26B 1/00 | 30/340 |
| D362,375 | S * | 9/1995 | Kramer | D7/693 | |
| 5,471,749 | A * | 12/1995 | Brady | B43L 12/00 | 33/562 |
| D379,914 | S * | 6/1997 | Bloch | D8/98 | |
| 5,669,142 | A * | 9/1997 | Beckers | B26B 3/08 | 30/340 |
| 5,678,315 | A * | 10/1997 | Hartzell | B23D 51/01 | 30/507 |
| 5,722,168 | A * | 3/1998 | Huang | B23D 51/01 | 30/160 |
| 5,806,391 | A * | 9/1998 | Schelli, III | B26B 29/06 | 30/286 |
| 5,924,348 | A * | 7/1999 | Schelli, III | B26B 29/06 | 30/294 |
| 6,018,880 | A * | 2/2000 | Wiggins | B26B 29/06 | 33/483 |
| 6,530,125 | B2 * | 3/2003 | Shippert | B25G 1/102 | 16/DIG. 12 |
| 6,543,141 | B1 * | 4/2003 | Biehl | B26B 29/06 | 33/483 |
| 9,126,324 | B2 * | 9/2015 | Hunkele | B26B 3/03 | |
| D850,196 | S * | 6/2019 | Rickstrew | D7/649 | |
| 10,913,168 | B1 * | 2/2021 | Salvitti | B26B 1/04 | |
| 11,007,657 | B2 * | 5/2021 | Dixon | B26B 3/00 | |
| D969,575 | S * | 11/2022 | Burton | D8/1 | |
| 11,801,611 | B2 * | 10/2023 | Sumi | B26B 3/08 | |
| D1,086,827 | S * | 8/2025 | Marfione | D8/20 | |
| 2005/0097759 | A1 * | 5/2005 | Igarashi | B26B 7/00 | 30/340 |
| 2005/0166732 | A1 * | 8/2005 | Valsoaney | B26D 1/04 | 83/513 |
| 2010/0293791 | A1 * | 11/2010 | Mueller | B26B 5/001 | 30/162 |
| 2017/0036365 | A1 * | 2/2017 | Darwin | B26B 29/06 | |
| 2017/0165855 | A1 * | 6/2017 | Stevens | B26B 29/06 | |

FOREIGN PATENT DOCUMENTS

| | | | | |
|---|---|---|---|---|
| GB | 867562 | A * | 5/1961 | B25G 1/00 |
| GB | 2525373 | A * | 10/2015 | B26B 29/06 |
| KR | 20220145479 | A * | 10/2022 | B26B 9/00 |
| SU | 373099 | A1 * | 3/1973 | |
| SU | 1544555 | A1 * | 2/1990 | |

* cited by examiner

KNIFE AND CUTTING GUIDE FOR CUTTING FIBROUS OR THICK SHEET MATERIALS

RELATED APPLICATIONS

This application claims the benefit of and hereby incorporates by reference two U.S. Provisional Patent Applications each having the same inventor as the present application: namely, application number 63278662 filed on Nov. 12, 2021 and having the title "Insulation Knife" and application number 63278654 filed on Nov. 12, 2021 and having the title "Batt Cutting Guide".

BACKGROUND

Energy costs and codes have created a heightened awareness of insulation products and performance. Mineral wool batt-type insulating products are increasingly being used over conventional fiberglass batting, as are various foam board insulations. While the cutting of conventional fiberglass batting can be challenging and put undue strain on an installer's hands and wrists, both these alternative insulating materials are harder to cut with the conventional prior art knives used by most insulation installers.

Cutting any type of insulation product with a knife involves angling the blade into the material, and drawing the blade through the material, towards the user's body. Conventional prior art knives typically have a blade on axis or generally parallel with the handle, which requires the user to flex the wrist at an extreme angle in order to align the blade into the cut to be made. This puts a significant strain on the wrist, before even starting the cutting action. The pull force is directed along the axis of the handle or grip, so that the user must squeeze tightly to maintain a grip on the handle, and prevent the hand from sliding lengthwise off of the handle, while pulling through the cut. It is not uncommon to see insulation installers hold a fiberglass batt up against a wall stud, and draw the knife downwardly. The knuckles are thereby arranged nearly vertically and the wrist is relatively relaxed, but the gripping action must still be forceful, to prevent the hand from slipping along the axis of the knife handle.

Ergonomic knives have been introduced, in which the cutting edge emanates from the bottom of a grip whose longitudinal axis (or grip line) is angled top forward, relative to the cutting edge. For cutting thicker materials, this requires a significant forward flex of the wrist to engage the blade to the full depth required. This rotational force results in excessive wrist strain while in use cutting thicker materials.

Insulation saws have been devised, particularly for cutting mineral wool batts and foam board. The grips are typical of handsaws, in that the grips are located above the cutting edge of the blade, and canted forward at an acute angle of about 60 degrees to the blade edge. On the pull stroke, the user's grip is more or less square to the direction of force applied. This means that the fingers can curl around the front side of the grip or handle, and the pull force is taken at the first knuckles of all four fingers together. The total force applied is only the pull force, and does not require an extra squeezing or compression force to keep the hand from sliding in the direction of the pull. Sawing requires extra time and energy, to repeatedly move the arm back and forth. A law of physics states that energy expended is proportional to surface area created, and the foam sawdust particles generate a far greater surface area than a knife cutting cleanly through the same material. Another liability is that the insulation particles created by the saw cutting process may also be both a nuisance and unhealthy to breathe.

To efficiently cut lofted fibrous batt insulation, such as fiberglass and mineral wool, they must be compressed or otherwise restrained while cutting. This allows the knife blade to cut through the fibers, as opposed to snagging, dragging and clumping the fibers. The thicker the batt, the greater the problem, and the greater the need to compress the fibers to enable an efficient cut to be made. It is common in the trades to compress the batt with the fingers, and hand pressure. This exposes the fingertips to inadvertent cuts, and is also slow, due to the hand having to be re-positioned every few inches of cut. Further this method often does not lend itself to accurate cutting. Minerals wools, which are becoming increasingly popular, will not easily fluff to fill gaps making accurate cutting even more imperative.

Some insulation installers have been known to use tee squares that are very commonly used by drywall installers. However, tee squares have disadvantages for use in cutting batt insulation. The tee head interferes with starting the long knife blade required for the deep cuts, and a typical 48 inch rule edge is too long and therefore unwieldy even for the longest, most common crosscut, on 23 inch wide batts. Trying to compress the batt fibers by pressing down on a long flat, slender rule that will flex, has the same problem as does compression by hand alone, in that the hand must be moved frequently, to provide compression at the point of cutting. The rule blade of the tee square will pivot under the hand that is pressing it down, due to eccentric pressure from the knife blade, so it is hard to keep the cut square and on-line. Finally, using the tee square requires the user to curl their hand under the tool, to place and orient it, then withdraw the grasping fingers from underneath, and shift to downward force on the rule.

Some insulation installers use so-called speed squares to cut insulation. These are typically diecast aluminum 45-degree right triangles, with one dropped edge, to quickly align with rigid materials, and include angle and length markings. The advantages offered by speed squares in carpentry include speed, simplicity, and easy portability; however, as a cutting guide for batt insulation, the speed square is too small for even the narrower nominal 16 inch wide batts. When using it as a tool for compression, the wide triangular surface means that it wants to compress eccentrically, and compression may be insufficient at the edge chosen to guide the knife. As with the tee square, grasping and placing the tool on soft insulation requires a finger grip on the bottom surface, which must be changed to a down force on the top surface only, once positioned.

DETAILED DESCRIPTION

Overview

Figure 1:
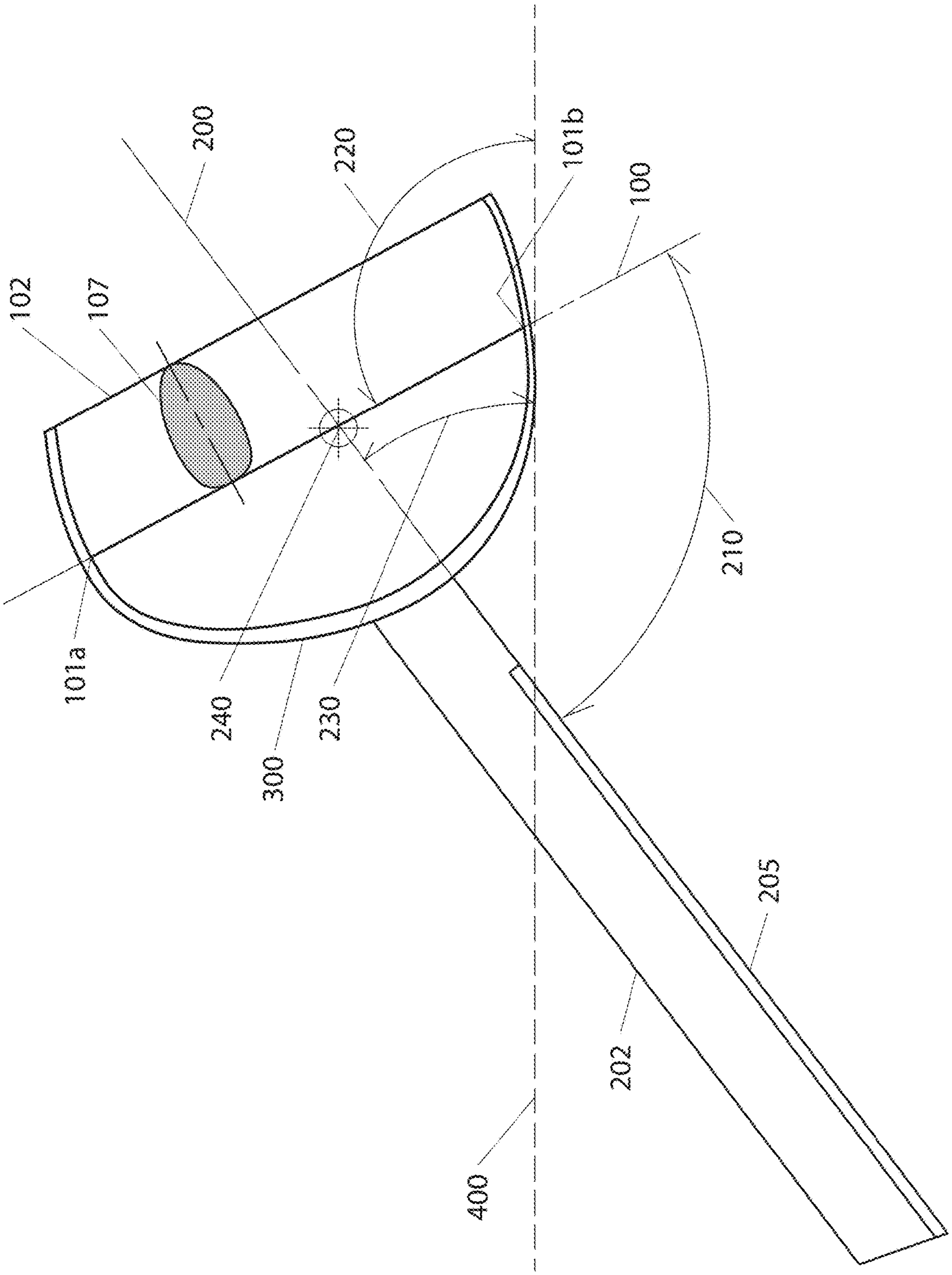
FIG. 1 illustrates a side view of a knife according to a first knife embodiment of the present invention.

Some embodiments of the invention comprise a knife for the cutting of fibrous batt insulation products, as well as rigid foam board insulation products. The knife has a handle and blade, each oriented so as to maximize the ability to pull the blade through the material to be cut, while minimizing the muscular effort and strain required of the user. Advantageously, in at least some embodiments, the overall effort required for cutting these types of materials is reduced as is the likelihood of insulation installers developing repetitive stress injuries.

The design of a typical insulation knife is complicated by the fact that a blade moving through a thick material generates a resistive force to the cutting action that will be centered in the often considerable thickness of the material and parallel to the top and bottom surface of the material being cut. The result of this offset of the resistive force is that a blade pulled through the material by means of a handle above the material surface must include a moment force applied to the handle, to prevent rotation of the blade up and out of the cut.

Embodiments of the insulation knife are arranged to allow the line of the user's grip to be a little bit less than perpendicular with the knife edge permitting the user to make a cut stroke with less stress and strain incident on his/her wrist. The knife's grip is typically sized to allow all four fingers to be curled around the grip, so that some or all of the four fingers may be able to apply a pulling force, approximately in line with the long axis of the user's forearm. The knife's blade may repose at an angle to both the user's hand and the material to be cut, such that the blade projects down through the full thickness of the material, with minimal flexion of the wrist muscles. In use, the knife's configuration facilitates orientating the bade at an acute angle (230) to the surface of the material, so that there may be a shearing or slicing action of the blade edge in the material, rather than a splitting action, which may cause bunching and dragging of fibrous materials. The design also facilitates the placement of the fifth finger and the base of the palm as close to the material as possible. This cutting geometry facilitated by the knife's geometry limits the length of the effective lever arm of the blade in the material minimizing the moment force on the wrist also reducing user stress and strain.

Also described herein are embodiments of a cutting guide for use in cutting lofted fibrous insulation batting. The guide can be used with embodiments of the knife or with prior art knives. Most basically, the guide comprises a frame or base that is generally rectangular in shape with guide edges along the perimeter thereof against which the side of a knife blade can be aligned. A grip or grip rail is position above the frame typically offset towards and parallel with one of the longer guide edges. The handle is coupled with the frame by associated struts. The guide may also include ruled markings on its upper face proximate the guide edges to facilitate the measurement of cuts to be made. In at least one variation the long sides of the rectangle may be 15" or 23", to correspond respectively to the actual width of batts produced to fit 16" and 24" on center framing.

Some of the advantages offered by at least some of the embodiments of the guide include: the ability to self square to a batt; the ability to be moved by a user without having to change or alter his/her hand position; having a unobstructed knife path along an edge; a built in measurement scale to facilitate accurate cuts; and the positioning of the user's hand away from the guide edge and consequently away from the cutting edge of a knife being used therewith. Further, the design allows for use with either hand to serve both right and left handed installers.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The phrases "knife edge" and "blade edge" are used interchangeably herein and refer to the typically elongated sharpened edge of the knife blade.

The phrase "blade line" refers to a substantially straight line (200) extending along the blade edge and projecting forwardly and rearwardly therefrom. It can also be referred to as the "blade edge line".

Figure 5:
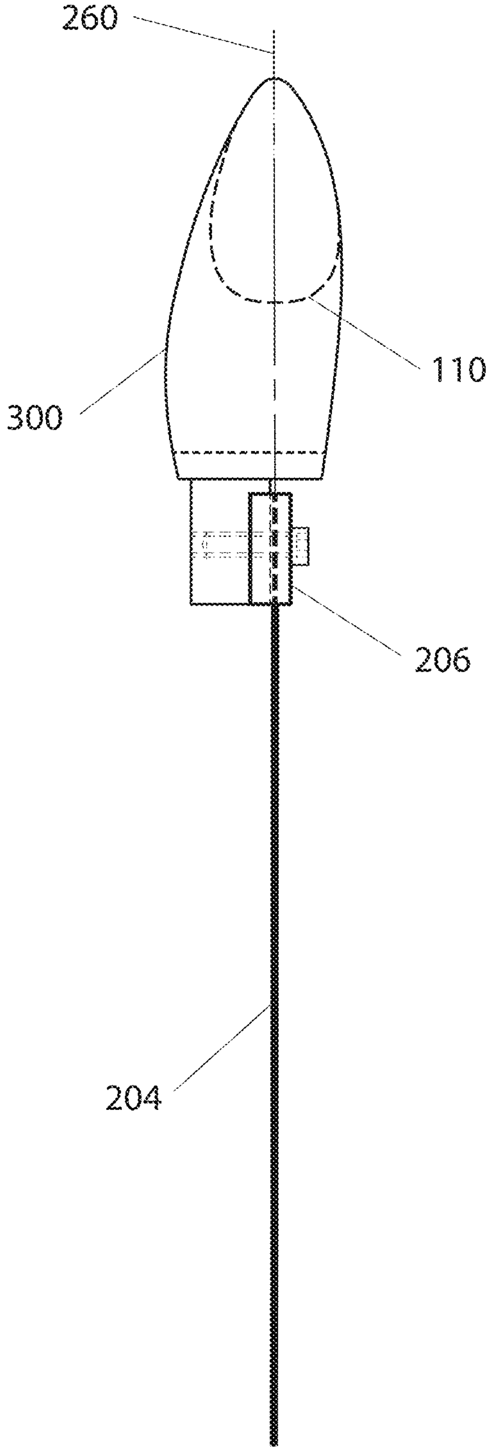
FIG. 5 illustrates a top view of a knife according to the fourth knife embodiment of the present invention
Figure 6:
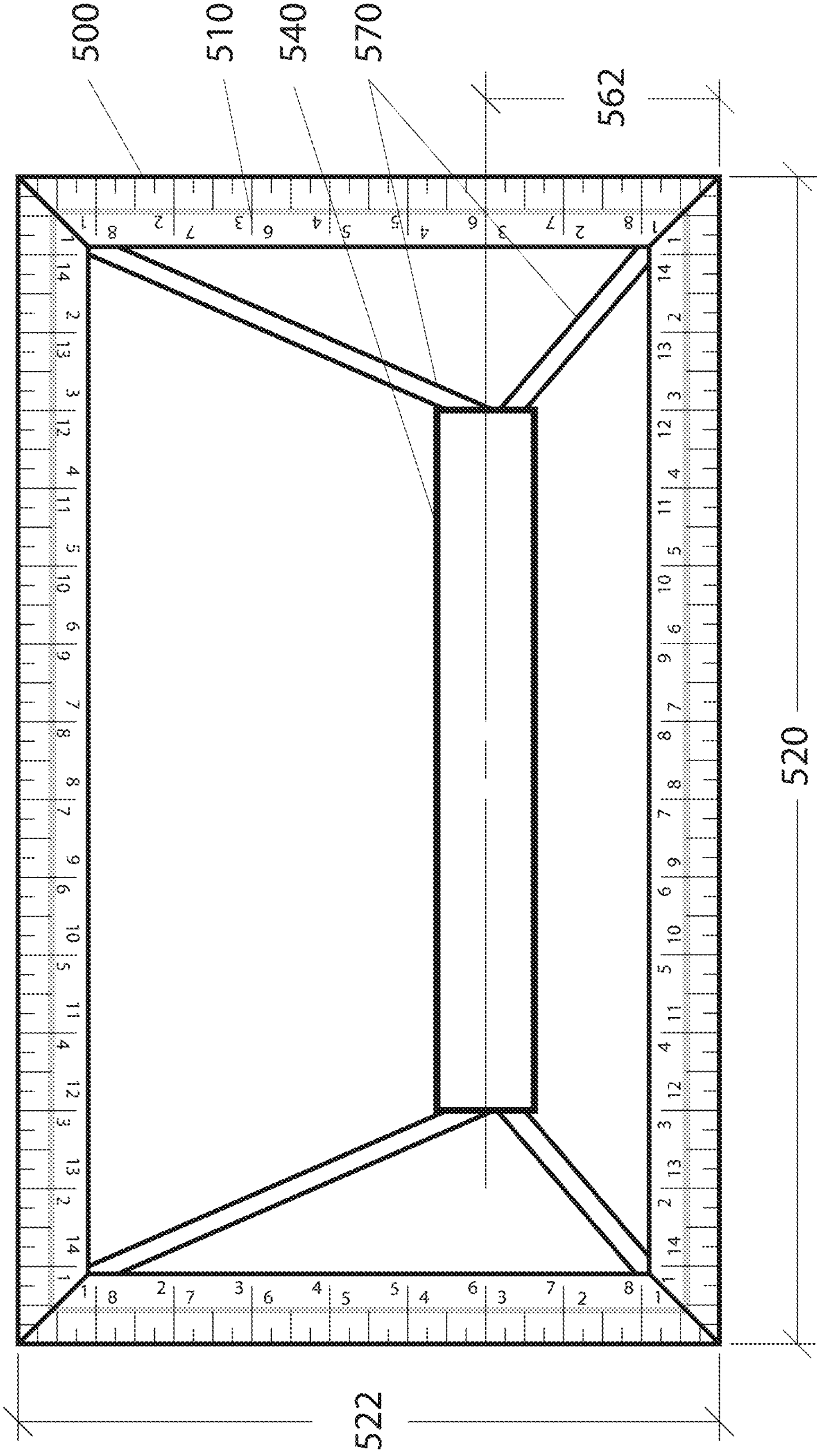
FIG. 6 illustrates a top view of a cutting guide according to an embodiment of the present invention.
Figure 7:
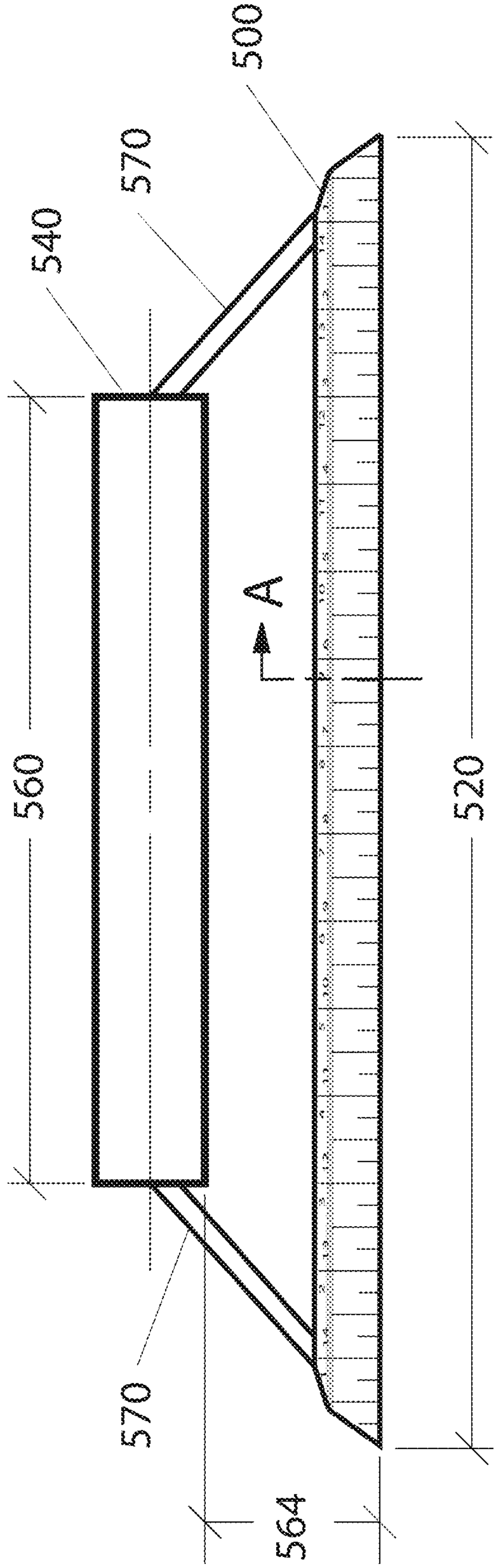
FIG. 7 illustrates a front side view of a cutting guide according to an embodiment of the present invention.
Figure 8:
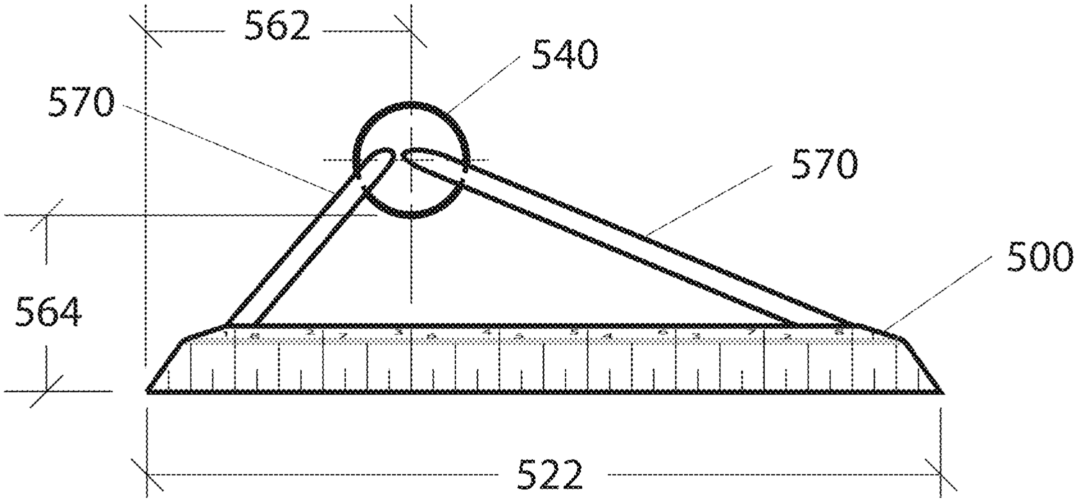
FIG. 8 illustrates a right side view of a cutting guide according to an embodiment of the present invention.

The phrase "blade plane" refers to a plane fully containing the blade line that extends upwardly through the midpoint of the knife blade's thickness as shown as a line (260) in FIG. 5.

The phrase "grip line" shall mean a line (100) defined by first and second points (101*a*&*b*) located in the blade plane. The first point (101*a*) is located on the grip's leading edge within the blade plane at a location furthest from the blade edge in the top half (above the grip intersection point 240). The second point (101*b*) is located on the grip's leading 6 edge within the blade plane at a location furthest from the blade edge in the bottom half (below the grip intersection point 240).

The phrase "grip intersection point" refers to a point (240) of intersection between the blade line and the grip line.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Embodiments of a Knife

Several embodiments of a knife are described herein with reference to FIGS. 1-5. The embodiments all share several basic components including a knife blade (202, 204) with a blade edge (205), a grip (102, 110) and a guard (300, 302, 304) disposed between and providing for the functional coupling of the blade and the grip.

The embodiments share a similar geometry specifically concerning the grip relative to blade edge. In particular, the angle (210) formed between a projection line coincident (200) with the blade edge (205), referred herein as the blade line, and the grip line (100) of the grip is preferably between 70 and 90 degrees, more preferably between 75 and 85 degrees and most preferably 80 degrees. Further, the intersection (240) of the blade line and the grip line is located at or slightly below a longitude mid-point of the grip line. The foregoing geometry naturally tends to create a circumstance wherein a user cutting relatively thick batting or foam holds the knife at an angle (210) of about 35 degrees between the blade edge and the horizontal top surface of an item being cut as is illustrated by a dashed line (400) in the Figures. When in this orientation, the grip (102) may lean away from the user, beyond perpendicular to the material surface (400), at an angle (220) that may be approximately 115 degrees.

A first embodiment of a knife incorporating one or more of the design parameters described above is illustrated in FIG. 1 with the knife orientated as it would be when cutting through a horizontally disposed piece of material. The knife comprises a generally semicircular or u-shaped guard (300) that has a grip (102) that extends between the open-end portions of the guard, and the blade (202) is attached, typically through welding or mechanical means, to the guard proximate the center of the guard's arc.

The blade (202) as shown may be straight and have a downwardly facing single blade edge (205) that extends from a distal end of the blade to a terminus a predetermined distance from the blade's attachment to the guard (300) at its proximal end. The blade is usually made of steel of the appropriate strength and hardness for the materials it is intended to cut. The length of the blade can vary dramatically depending on the specific intended use but typically ranges from about 3 to 10 inches. Further, while a substantially straight blade is illustrated, variations wherein a portion of the blade, such as a distal end portion, is curved are contemplated.

As indicated above the guard (300) may be semi-circular or u-shaped and of sufficient size to permit the fingers of a user to fit between it and the grip (102) when the knife is being held. The grip can be made of any suitable material such as steel, aluminum alloy, other metals, and reinforced plastics. In at least one variation the guard comprises steel and is about 0.060" thick with a side to side width approximating the width of the grip at about 0.5" to 0.75". Besides providing a means for joining the blade and the grip, the guard effectively hinders the chance that a user's hand slide into the blade if the user's grip on the grip unintentionally releases.

The grip (102) can be comprised of any suitable material and comprise any suitable cross-sectional shape that will permit a user to comfortably hold the knife while using it to cut material. The longitudinal length of the grip is 3.5" to 4.5" permitting a user the ability to comfortable wrap all four of his/her fingers therearound. As shown in FIG. 1, the grip is a generally ovular slightly tear-shaped cross section (107). A typical grip may be made of plastic with or without a metal core, and may also be covered in a resilient cushioning material. The grip may be attached to the ends of the guard in any suitable manner including adhesive bonding and/or mechanical attachment.

Figure 2:
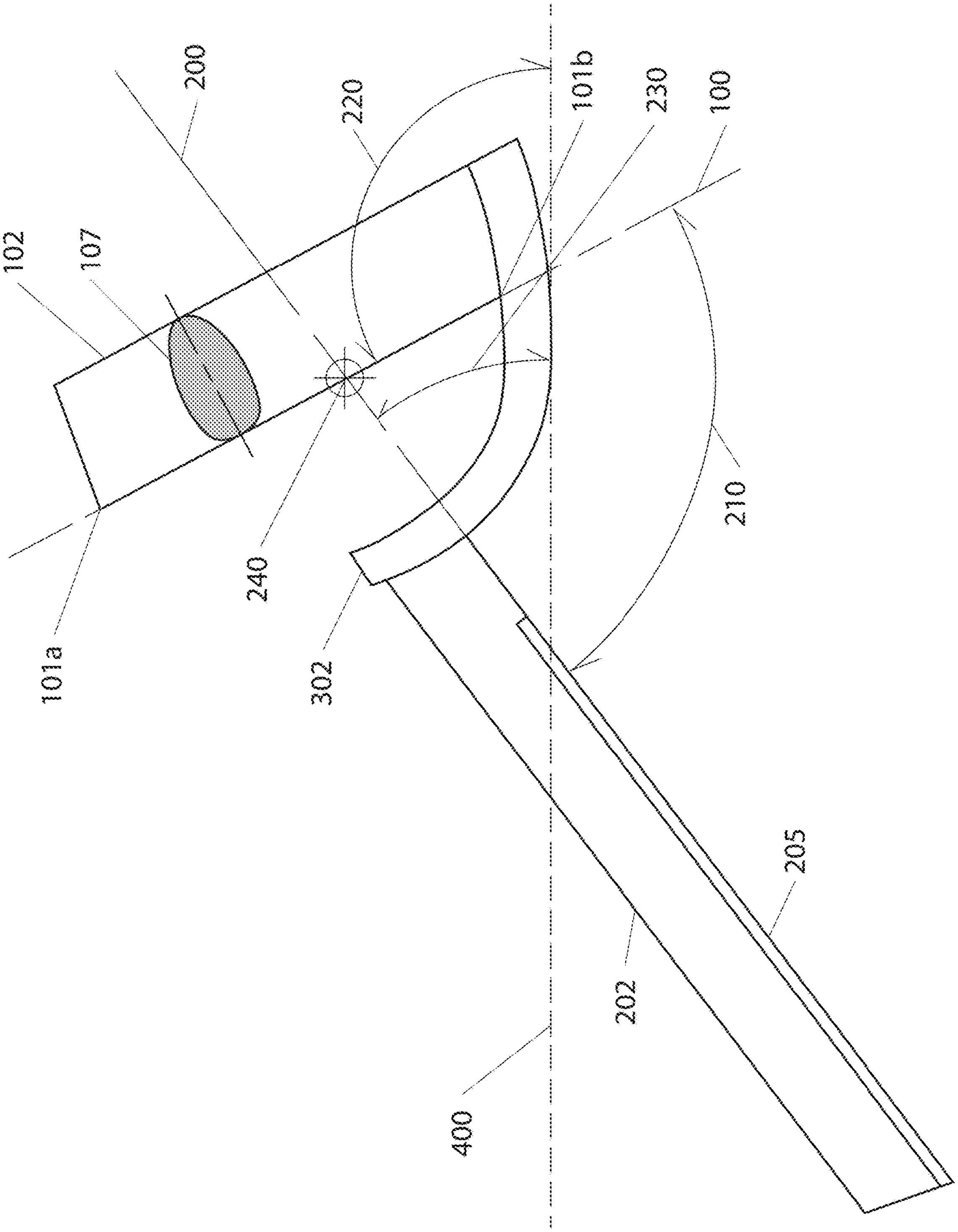
FIG. 2 illustrates a side view of a knife according to a second knife embodiment of the present invention.

A second embodiment of the knife is shown in FIG. 2 and is primarily distinguished from the first embodiment in the configuration of the guard (302). In this variation, the guard does not form a complete arc around the finger area forward of the grip (102), but rather may approximate a quarter circle. The guard (302) may emanate from only the bottom of the grip (102), and thereby connect the required blade (202) geometry to the grip (102) geometry, while leaving the top of the grip (102) unguarded and open. The guard is typically thicker than the guard on the first embodiment to provide the desired stiffness.

Figure 3:
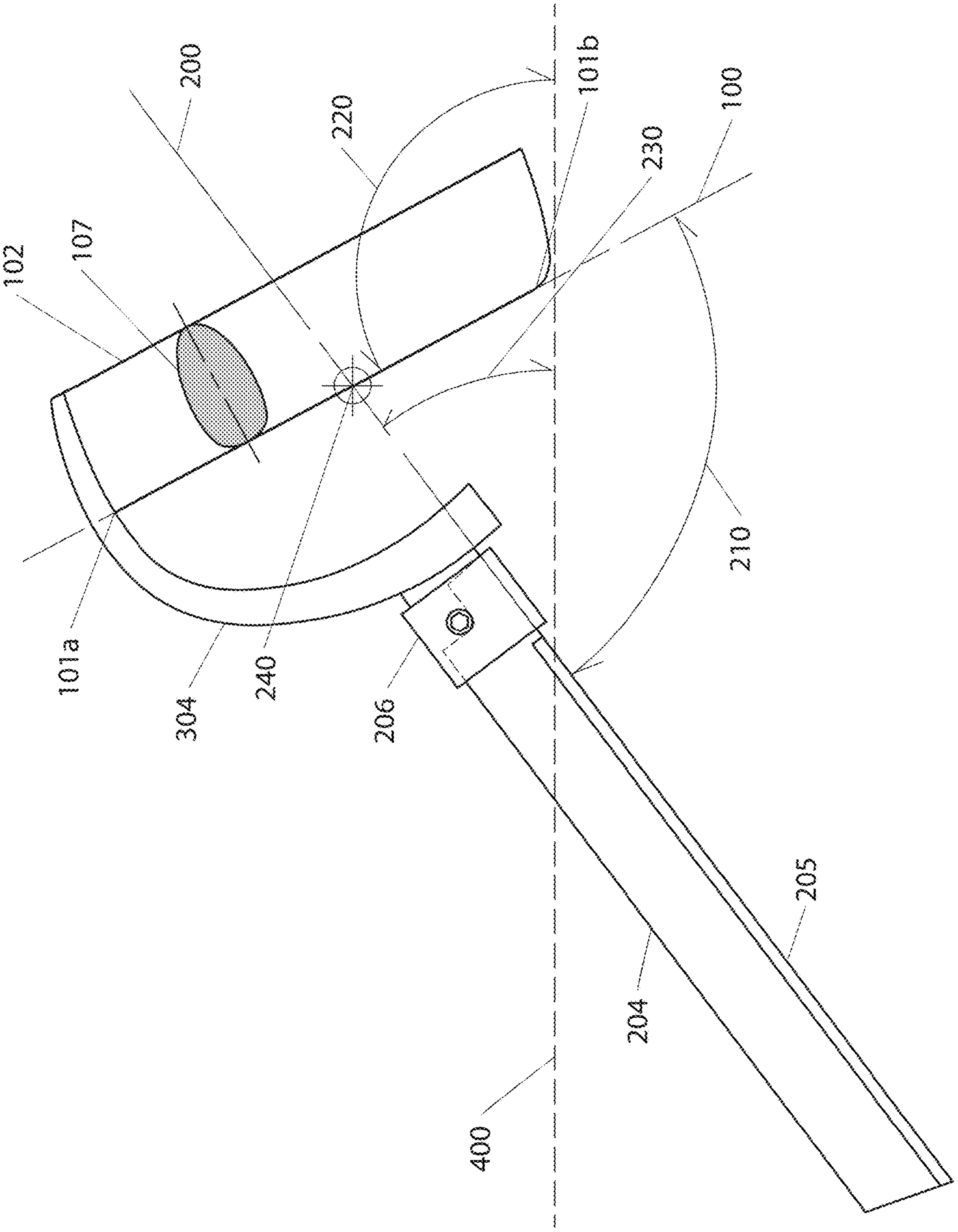
FIG. 3 illustrates a side view of a knife according to a third knife embodiment of the present invention.

A third embodiment of the knife is shown in FIG. 3 and is distinguished over the second embodiment in the orientation of the guard (304) and the use of a blade clamp (206) to secure a removable and replaceable blade (204). As shown the guard is generally similar to the guard of the second embodiment except it extends upwardly from the blade mounting location instead of downwardly. The third embodiment also includes a blade clamp that is attached to the front side of the guard. The clamp can be of any suitable design as are well known in the art, and can be configured to receive and secure blades of different lengths and configurations having a compatible mounting tang. In one example, the blade clamp comprises a mechanism similar to those used in reciprocating saws. This embodiment permits a user to replace a blade that has become dull or damaged with a new blade. Further, the blade clamp allows a user to select a blade of a desired length for a particular job, or choose a blade with a particular blade edge, such as one that is serrated.

Figure 4:
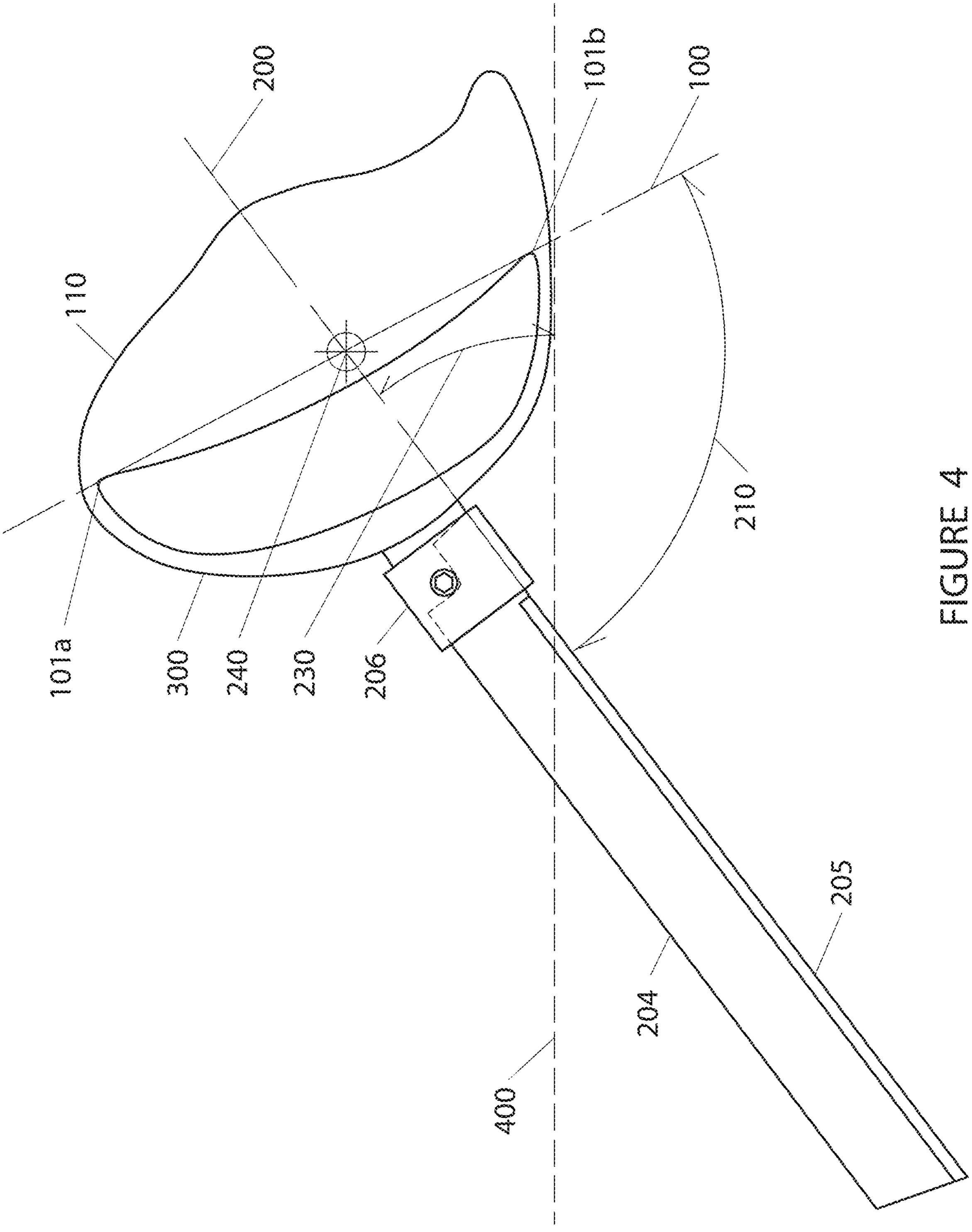
FIG. 4 illustrates a side view of a knife according to a fourth knife embodiment of the present invention.

A fourth embodiment of the knife is shown in FIGS. 4 and 5 and is distinguished over the first embodiment by having a blade clamp (206) similar to the one described with reference to the third embodiment permitting the use of a replaceable blade (204), and utilizing a ergonomically-shaped grip (110) The grip (110) may have contoured leading and trailing faces, to better conform to the profile shape of the human hand while gripping the knife. This may serve to more evenly distribute the pressure from the pulling force to all fingers curled around the grip.

FIG. 5 is a top view illustration of the fourth embodiment. Of important note is how the blade clamp 206 when centered on the front surface of the guard 300 causes the knife blade 204 to be offset to one side; the left in the illustrated example. To ensure the grip 110 is centered left to right relative to the knife blade and the blade plane, the guard curves to the left. The amount of left to right adjustment of the guard to ensure the alignment of the grip and the knife blade will vary depending on the type, design and configuration of the blade clamp.

The grip, the guard, and the blade clamp mechanism may a fabricated assembly of various component parts. The component parts may be metal, plastics or composites depending on the material or combination of materials best suited for a particular design or configuration. A combination of the grip and guard may also be die cast in metal with a clamp mechanism fastened thereto by welding, brazing, adhesive joining or mechanical fastening. The combination may also be injection molded in reinforced or unreinforced polymeric material, and may have a boss for the blade clamp molded therein. Any embodiment of the grip may have a non-slip or cushioned grip surface material applied or over-molded on the body of the grip.

Embodiments of a Cutting Guide

The guide is generally comprised of an open rectangular frame (500) having opposing long rungs (520) and opposing short rungs (522). The open rectangular frame incorporates a grip rail (540) located above the surface of the frame (500), that is oriented substantially parallel to the long rungs of the rectangle. The grip rail (540) may be disposed over the entire length of the frame (500), or may be truncated in length (560) relative to the frame, with an arrangement of smaller structural elements or struts (570), connecting the grip rail (540) to the frame (500). The grip rail (540) may be disposed centered on the narrow dimension of the frame, or may be offset (562) closer to one long rung of the frame compared to the other long rung, such that downward pressure on the grip rail will apply a greater pressure to the nearer long rung, proportional to the relative location of the grip rail (540) across the width of the frame (500). In use, the frame (500) may be oriented squarely across the batt, and then pressed downward to compress the fibers of the batt. A knife blade may then be drawn along the selected guide rung of the frame yielding a straight cut.

Figure 9:
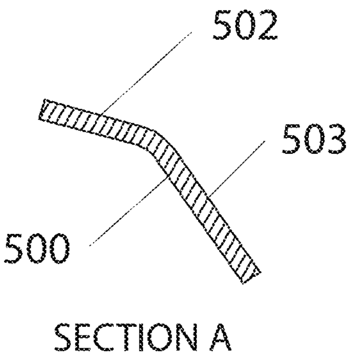
FIG. 9 illustrates a cross sectional view of the frame taken at line A of FIG. 7 according to an embodiment of the present invention.

The frame (500) may be of metal, and have a cross section of a folded plane, which may provide greater longitudinal stiffness to the guide rung and thus compress the batts more evenly over the length of the rung. As shown in FIG. 9, the lower plane portion (503) of the frame (500) may angle down, so that the narrow bottom of the guide rung first contacts the batt, and applies enhanced compression to the batt directly there below. The upper plane portion (502) of the folded frame (500) may be generally horizontally 10 orientated, to provide a more easily readable surface for rule markings (510) inscribed, printed or otherwise formed thereon.

The long rungs (520) of the frame (500) may have a length dimension of 15 inches or 23 inches, nominally corresponding to the widths of standard batt insulation products. The short rungs (522) of the frame may have a width dimension of 9 inches or 11 inches, nominally corresponding to the depths of standard framing materials, thus facilitating measuring and cutting the insulation pieces to fill joist or rafter bay ends. Inch and fractional marks (510) may be stamped or molded in and or printed on or along one or more rungs. The scale (510) may be delineated in integral inches, the numerals being stamped, molded or otherwise applied in any manner to the frame rails. The inch scales (510) may be doubly enumerated in two directions, starting from each end of a given rung. The sizing of the frame (500) and the markings (510) thereon may also be per metric standards of sizing, and delineated per metric units of measure.

As previously mentioned, the grip rail (540) may be displaced (564) up and out of the plane of the frame (500). This allows the frame (500) to compress the batt at the frame (500) edges, without unnecessary compression of the batt within the open interior of the frame, or from the user's hand curled under the grip rail (540). The grip rail (540) may be of any suitable cross section from round to ovular. The grip rail may also have an ergonomic cross section and/or a configuration that facilitates the application of a torque or twisting motion to the frame by wrist action. Further, the cross section may be made broader or otherwise sufficiently sized or shaped as to allow for downward pressure from the user's palm, while limiting the strain on the hand. The grip rail may be of solid material or hollow element. The grip rail may also have a cushioning element overlaying a structural core.

The grip rail (540) may be less than the length (520) of the long dimension of the frame. The grip rail (540) may be connected to the frame by four struts (570) or other slender structural elements. These struts (570) may each run from two adjacent corners of the short side of the frame (500) to one end of the grip rail (540), and be repeated at the two corners of the opposite short side of the frame (540) to the opposite end of the grip rail (540). This arrangement may induce a tensile force into the frame (500), when pushing downward into a batt. This serves to minimize bending in the frame (500), allowing for minimal sizing of the frame (500) and connector strut (570) elements. In a variation, the struts (570) may take the form of a molded surface that connects two corners of the width (522) of the frame to the corresponding end of the grip rail (540).

Figure 10:
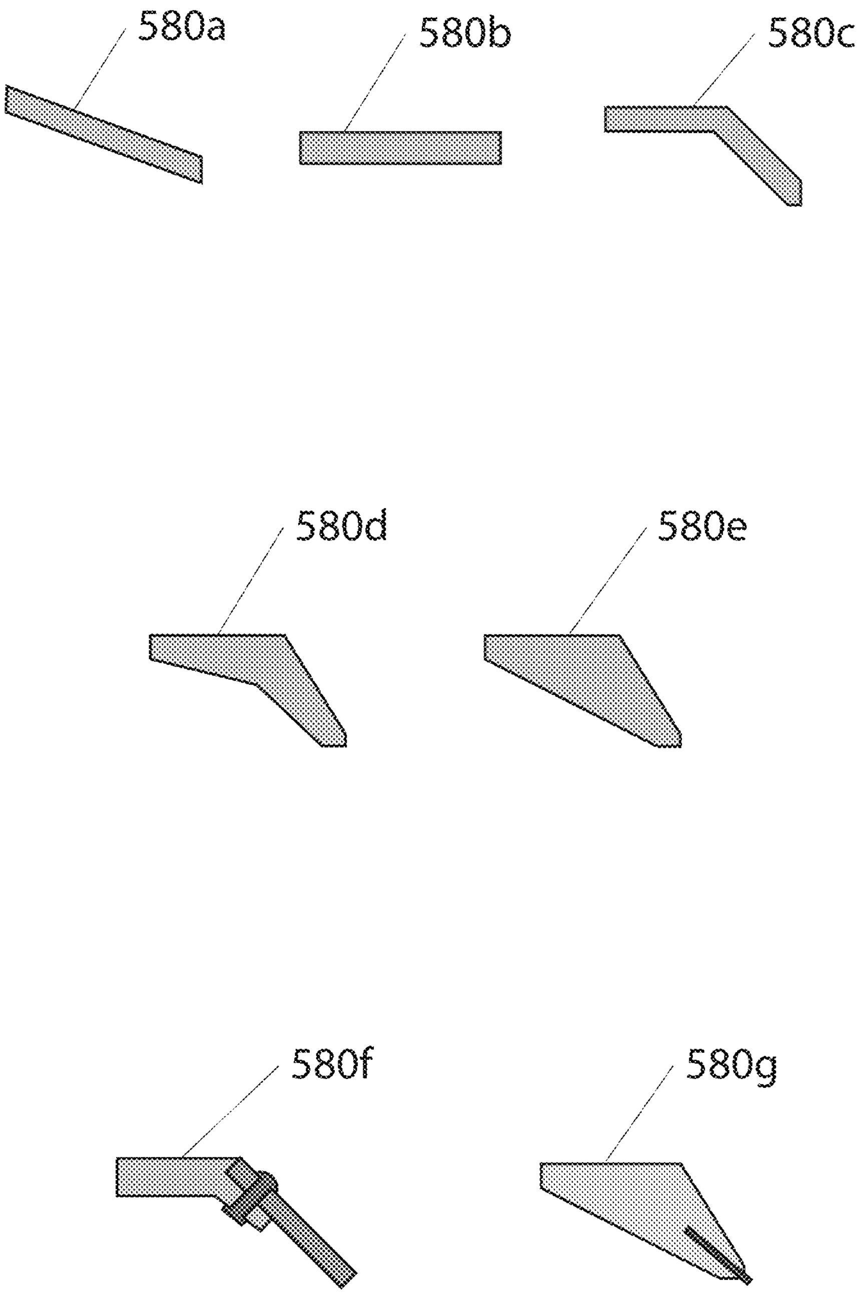
FIG. 10 illustrates cross sectional variations of the frame including the guide edge according to embodiments of the present invention.

The frame (500) may be composed of discrete parts that are assembled during manufacture. These parts may be extruded and cut to size, or molded in any material, or any combination thereof. The means of assembly may include rivets, welding, adhesives, glues or resins, or any combination thereof. The frame (500) itself may be composed of thin flat or folded elements (580*a*-*c*) in various configurations as shown in FIG. 10. The frame itself may also be composed of extruded or molded elements (580*d*-*e*) of a suitable cross section. Individual frame rails may be directly attached to the strut (570) ends at each corner of the complete rail and strut assembly.

The frame (500), or the entire device, may be molded as a single piece. This may take the form of a die-casting in a suitable metal, or as an injection molded plastic or polymer piece. A plastic or polymer injection molded device may include one or more metal edges molded into the frame as also shown in the cross section (580*g*) in FIG. 10, to provide a durable, cut resistant guide edge for an insulation knife. A plastic or polymer injection molded device may also include one or more metal edges (580*f*) mechanically attached to molded frame rails.

Methods of Using the Knife and Guide, Separately, and Together Applications of this Invention Embodiments of the knife are configured for use in cutting fibrous batt insulation, such as fiberglass and mineral wool. They can also be used to cut and trim foam board insulation, as well, as other sheet materials, such as cardboard. The knife can be used freehand or in conjunction with a straightedge or other suitable cutting guide, such as, but not limited to, embodiments of the cutting guide described herein.

FIGS. 1-4 show the knife in relation to a dashed line 400 that represents the ideal orientation of the knife relative to the top surface of the material being cut. As shown the grip line is angled forwardly relative to the line making about a 115 degree cutting angle with the line. Embodiments of the knife are configured so that at this angle the blade edge extends at least slightly above the line, and preferably, depending on the length of the blade, it extends completely through the thickness of the associated material. Given the dimensions of the knife embodiments, and in particular the angle between the blade edge and the grip line, as well as, the intersection of the blade edge line at or below the midpoint of the grip line, experimentation has demonstrated that installers using the knife naturally gravitate towards using it at or near the prescribed cutting angle.

Cutting is usually performed by way of a pulling motion at or near the specified cutting angle causing the material, especially fibrous materials, to relatively easily shear.

When cutting fibrous batt materials, it is advantageous to compress the batt proximate the desired cut line. This can be accomplished in a number of ways from compressing the batt with the user's other hand, a ruler or straightedge, a strip of lumber, or preferably and embodiment of the cutting guide described herein. Compressing the fibers greatly enhances the ease and precision at which the batts can be cut. Furthermore, when using an item to compress the fibers that has a straight edge or side, it can also be used to guide the cut.

To use embodiments of the cutting guide described herein, the user typically places the guide over the batt aligning the long edge closet to the grip rail with the desired location of the cut. Where the cut is to be perpendicular to the length or the width of the subject batt, the short edge of the guide can be used to align the guide to ensure an orthogonal cut. The ruled surfaces can be used to measure the cut as is desired.

The user then presses down on the guide using the handle thereby compressing the underlying batt material especially along the edge closest to the grip rail. While compressing the batt by applying pressure with one hand, the user can cut the batt using a suitable knife using the other hand guiding the knife along the edge of the guide. While any suitable knife can be utilized, embodiments of the guide work particularly well in combination with embodiments of the knife described herein.

For cuts longer than the length of the guide, the user merely relieves the pressure applied against the batt through the grip handle and slides or otherwise moves the guide's edge along the line to be cut.

As can be appreciated, use of the guide is not limited to fibrous batts, but rather can be used as a layout, marking and cutting guide for any flat materials. The elevated handle facilitates moving the guide around a piece of flat material quickly and easily offering advantages over traditional rulers and squares.

Alternative Variation and Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A knife comprising:

a knife blade having an elongated substantially linear blade edge and the knife blade defining a blade plane and a blade line; and a grip coupled with the knife blade, the grip having a grip longitudinal length, a grip leading edge located in the blade plane, a grip top end and a grip bottom end located along the grip leading edge, and the grip top end and grip bottom end defining a linear grip line, the grip line having a grip line length between the grip top end and the grip bottom end;

a knife guard having a blade clamp, the knife guard being positioned between and spaced apart the knife blade and the grip, the knife guard including an outer guard surface to which the blade clamp is attached, at least a bottom guard end which is attached to the grip bottom end, the blade clamp being configured to removably secure the knife blade therein;

wherein an intersection angle made between the blade line and the grip line at a grip intersection point is between 70 and 89 degrees with the grip top end being canted rearwardly relative to the grip bottom end, and the grip intersection point occurs at a location wherein a portion of the grip line above the grip intersection point is 50-60% of the grip line length.

2. The knife of claim 1 wherein the intersection angle is between 75 and 85 degrees.

3. The knife of claim 1 wherein the intersection angle is between 78 and 82 degrees.

4. The knife of claim 1 wherein the portion of the grip line above the grip intersection point is 53-57% the grip line length.

5. The knife of claim 1, wherein the grip is ergonomically shaped for a human hand hold.

6. A method of using the knife of claim 1 to cut batt material, the method comprising: while holding the knife by the grip in one hand, positioning the knife blade against the edge of a fibrous batt along a desired cut line with the angle between the blade edge and a top surface of the fibrous batt being about 35 degrees; and pulling the knife through the fibrous batt to cut it.

7. In combination, a knife and a cutting guide:

the knife comprising;

a knife blade having an elongated substantially linear blade edge and the knife blade defining a blade plane and a blade line, and a grip coupled with the knife blade, the grip having a grip longitudinal length, a grip leading edge located in the blade plane, a grip top end and a grip bottom end, and the grip defining a grip line, wherein an intersection angle made between the blade line and the grip line is between 70 and 89 degrees with the grip line being canted rearwardly, and a grip intersection point occurs at a location at or below a center point of the grip line;

the cutting guide comprising;

two opposing long rungs with two opposing short rungs joined to the long rungs at their respective corners forming an open rectangle frame, a grip rail positioned above the open rectangle frame, the grip rail sized and configured to be held in the hand of a person, the grip rail being parallel to one of the pair of long rungs or the pair of short rungs, and a plurality of struts, the struts attached to and extending upwardly from the open rectangle frame on first strut ends and being attached to the grip rail at second strut ends.

8. The combination of claim 7, wherein the cutting guide further includes ruled markings on the top surfaces of one or more of the short and long rungs.

9. The combination of claim 7, wherein the grip rail is parallel to the long rungs and is positioned closer to a first long rung relative to a second long rung.

10. A method of using the knife of claim 7 to cut batt material, the method comprising:

placing the cutting guide against the batt and aligning an outside edge of the long rung at a desired cut line;

while holding the cutting guide at the grip rail with one hand, compressing the fibrous batt at the cutline by applying downwardly pressure to the guide through the grip rail;

while holding the knife by the grip in another hand, positioning the knife blade against an edge of a fibrous batt along the outside edge with the angle between the blade edge and a top surface of the fibrous batt being about 35 degrees; and pulling the knife through the fibrous batt to cut it.

11. A knife comprising:

a knife blade having an elongated substantially linear blade edge and the knife blade defining a blade plane and a blade line; and a grip coupled with the knife blade, the grip having a grip longitudinal length of 3.5" to 4.5", a grip leading edge located in the blade plane, a grip top end and a grip bottom end, and the grip top end and a grip bottom end defining a linear grip line and a grip line length; and a generally u-shaped knife guard having a blade clamp, the knife guard being positioned between the knife blade and the grip, the knife guard including an outer guard surface to which the blade clamp is attached, an upper guard end which is attached to the grip top end and a bottom guard end which is attached to the grip bottom end, the blade clamp being configured to removably secure the knife blade therein;

wherein an intersection angle made between the blade line and the grip line is between 70 and 89 degrees with a top of the grip line being canted rearwardly relative to a bottom of the grip line, and a grip intersection point occurs at a location wherein a portion of the grip line above the grip intersection point is 50-60% of the grip line length.

12. A method of using the knife of claim 11 to cut batt material, the method comprising:

while holding the knife by the grip in one hand, positioning the knife blade against the edge of a fibrous batt along a desired cut line with the angle between the blade edge and a top surface of the fibrous batt being about 35 degrees, and with the outer guard surface resting on the top surface; and pulling the knife through the fibrous batt to cut it.

13. The method of claim 12 further comprising:

providing a cutting guide, the cutting guide including (i) two opposing long rungs with two opposing short rungs joined to the long rungs at their respective corners forming an open rectangle frame, (ii) a grip rail positioned above the open rectangle frame, the grip rail sized and configured to be held in the hand of a person, the grip rail being parallel to one of the pair of long rungs or the pair of short rungs, and (iii) a plurality of struts, the struts attached to and extending upwardly from the open rectangle frame on first strut ends and being attached to the grip rail at second strut ends; and while holding the cutting guide at the grip rail with another hand, compressing the fibrous batt at the cutline by applying downwardly pressure to the guide through the grip rail.

* * * * *